United States Patent [19]
Köhler et al.

[11] Patent Number: 6,027,096
[45] Date of Patent: Feb. 22, 2000

[54] SERVO VALVE

[75] Inventors: Karl-Hans Köhler, Wernau; Gerd Speidel, Winterbach, both of Germany

[73] Assignee: Mercedes-Benz Lenkungen GmbH, Düsseldorf, Germany

[21] Appl. No.: 09/159,175

[22] Filed: Sep. 23, 1998

[30] Foreign Application Priority Data

Sep. 26, 1997 [DE] Germany ............... 197 42 563

[51] Int. Cl.[7] ............... F15B 9/08; F16K 31/00
[52] U.S. Cl. ............... 251/64; 91/375 A; 137/625.23
[58] Field of Search ............... 251/64; 137/625.23, 137/625.22; 91/375 A, 375 R

[56] References Cited

U.S. PATENT DOCUMENTS

| | | | |
|---|---|---|---|
| 4,966,192 | 10/1990 | Umeda | 137/625.23 |
| 5,033,505 | 7/1991 | Eidsmore | 251/64 X |
| 5,680,804 | 10/1997 | Eberhart | 91/375 A |
| 5,797,309 | 8/1998 | Eberhart | 91/375 A |
| 5,851,006 | 12/1998 | Spillner et al. | 91/375 A X |
| 5,937,900 | 8/1999 | Pfeifer | 91/375 A X |

FOREIGN PATENT DOCUMENTS

| | | |
|---|---|---|
| 28 14 230 | 1/1980 | Germany . |
| 42 41 531 | 6/1994 | Germany . |

*Primary Examiner*—John Rivell
*Assistant Examiner*—Meredith H. Schoenfeld
*Attorney, Agent, or Firm*—Kenyon & Kenyon

[57] ABSTRACT

The present invention concerns a servo valve, in particular for hydraulic power steering systems of motor vehicles, in the form of a rotary slide valve having a rotary slider and a control bushing which coaxially encloses the latter and is rotatable about a rotation axis, against spring force, relative to the rotary slider. The present invention includes a particular spring arrangement which has two helical compression springs lying in a radial plane of the rotation axis.

14 Claims, 2 Drawing Sheets

SERVO VALVE

FIELD OF THE INVENTION

The present invention concerns a servo valve, in particular for hydraulic power steering systems of motor vehicles, in the form of a rotary slide valve having a rotary slider and a control bushing.

RELATED TECHNOLOGY

Servo valves of this kind are commonly known, and are used on a production basis. In the case of a power steering system of a motor vehicle with ordinary steering by way of a steering wheel, a rotary slider and a control bushing comprise parts of a shaft sequence which mechanically couples the steering wheel to the vehicle's steered wheels. The rotary slider and control bushing are deflected relative to one another against the spring force, in accordance with the forces and torques acting between the steering wheel and vehicle's steered wheels, a greater or lesser distance out from a relative center position. The effect of this rotation stroke between the control bushing and rotary slider is that a hydraulic servomotor controlled by the servo valve is controllably acted upon by hydraulic pressure or by a hydraulic pressure difference in one direction or another depending on the direction of the relative rotation between control bushing and rotary slider, and the respective steering maneuver is assisted, i.e. the force to be applied manually to the steering wheel is correspondingly reduced.

The relative rotation between rotary slider and control bushing takes place against a spring force that is generated by a spring arrangement and rises with the relative rotation angle. The rotation of the steering wheel thus takes place against a certain force which reproduces a steering resistance that, in a mechanical steering device, is brought about by displacement of the wheels on the road. This ensures that even with a power steering system, a proper feel for the drive is obtained for the steering forces actually acting on the steered wheels of the vehicle. In addition, the spring force acting between the rotating parts results in a return torque which, when the steering wheel is not under load, ensures that the rotary slider and control bushing return to their center position or neutral position, thus terminating the hydraulic steering force assistance.

The spring force is generated, for example in a servo valve known from German Patent Document No. 28 14 230, by a spring arrangement having leaf springs which extend transversely to the rotation axis and centeredly through the control 10 bushing and rotary slider, thus mechanically coupling the rotary slider to the control bushing.

In another valve arrangement known from German Patent No. 42 41 531 C1, the spring force is generated by a leg spring, arranged concentrically with the control bushing and rotary slider, whose legs extend radially through axial slits in the control bushing and the rotary slider and thereby mechanically couple these rotating parts.

The steering force to be applied manually before the power assistance is activated is determined by the preload to be overcome in the spring elements which generate the spring force acting in rotary fashion between the rotating parts. This corresponds at the same time to the return force with which the rotary slider and the control bushing are preloaded by the spring means into their neutral position. This preload force results from the resiliency of the spring means that are used. In order to be able to guarantee a consistent preload and thus a consistent steering feel in the context of series production, close tolerances must be maintained. To allow steering systems having different steering characteristics to be obtained for different vehicles and vehicle models, other spring means having a resiliency adapted to the desired requirements must be used.

SUMMARY OF THE INVENTION

The present invention permits configuring a servo valve, in particular for hydraulic power steering systems of motor vehicles, valve having a rotary slider and a control bushing which coaxially encloses the latter and is rotatable about a rotation axis, against a spring force, relative to the rotary slider, in such a way that during assembly, different preload forces can be set and tolerance-related deviations can be compensated for.

The present invention provides a servo valve in which:
- a flange having rotary clearance with respect to the control bushing is joined nonrotatably to the rotary slider;
- the flange has two through openings, arranged eccentrically with respect to the rotation axis, which lie in a plane running transversely to the rotation axis;
- each through opening is covered at one open end on the rotary slider side, approximately up to its center plane in the direction of the rotation axis, by a region of the flange, the flange region constituting a first buttress surface which faces the open end and is axially spaced away with respect to a longitudinal axis of the through opening;
- the control bushing is prolonged on the flange side in the direction of the rotation axis by an extension that constitutes a second buttress surface which is substantially congruent with the first buttress surface at least with respect to the rotation axis, and which covers the open ends of the through openings on the control bushing side approximately up to their center plane in the direction of the rotation axis; and
- a helical compression spring which is braced at one end against a closure plug which is arranged in the region of the end of the through opening facing away from the buttress surfaces and can be immobilized with respect to the longitudinal axis of the through opening, and which at the other end is preloaded against the buttress surfaces, is housed in each through opening.

The present invention is based on the general idea of effecting energy transfer between the rotary slider and the control bushing with the aid of axially extending helical compression springs, the helical compression springs each being located in a through opening whose axial length is or can be determined by a closure plug. During assembly of the servo valves, the preload force with which the helical compression springs rest against the buttress surfaces and with which they preload the rotary slider and the control bushing into their neutral positions can be adjusted, irrespective of production tolerances (e.g. tolerances for the buttress surfaces, for the spacing between the open ends of the through openings and the buttress surfaces, and for the resiliency of the particular helical compression springs being used), by corresponding axial positioning of the closure plug in the respective through opening. When the desired preload has been set, the respective closure plug is axially immobilized in its through opening in suitable fashion. For immobilization, the closure plug can, for example, be welded or caulked in the desired axial position, or can be jammed in place by way of a screw mounted on the flange radially with respect to the through opening.

In addition to compensation for any tolerance-related dimensional deviations that may be present, it is also possible with the servo valve proposed according to the present invention, using one and the same spring device (i.e. the same helical compression springs), to set different preload forces which affect the steering characteristics of the vehicle. With a relatively low preload, for example, a particularly smooth-running steering system with an early onset of power assistance can be achieved. Similarly, for a vehicle with sporting ambitions, a relatively high preload can be used to set a power assistance whose onset occurs only with greater manual force, so that the steering forces actually acting at the steered wheels of the vehicle are transmitted to a greater extent via the steering wheel to the driver.

The present invention also provides an alternative embodiment for a servo valve, in particular for hydraulic power steering systems of motor vehicles, in the form of a rotary slide valve having a rotary slider and a control bushing which coaxially encloses the latter and is rotatable about a rotation axis, against spring force, relative to the rotary slider, characterized by the following features:

a flange (1) is joined nonrotatably to the control bushing (4) with rotary clearance with respect to the rotary slider (5);

the flange (1) has two through openings (10), arranged eccentrically with respect to the rotation axis (9), which lie in a plane running transversely to the rotation axis (9);

each through opening (10) is covered at one open end (11) on the control bushing side, approximately up to its center plane in the direction of the rotation axis (9), by a region (17) of the flange (1), the flange region (17) constituting a first buttress surface (13) which faces the open end (11) and is axially spaced away with respect to a longitudinal axis (12) of the through opening (10);

the rotary slider (5) is prolonged on the flange side in the direction of the rotation axis (9) by an extension (18) that constitutes a second buttress surface (14) which is substantially congruent with the first buttress surface and which covers the open ends (11) of the through openings (10) on the rotary slider side approximately up to their center plane in the direction of the rotation axis (9); and a helical compression spring (2) which is braced at one end against a closure plug (3) which is arranged in the region of the end of the through opening (10) facing away from the buttress surfaces (13 and 14) and can be immobilized with respect to the longitudinal axis (12) of the through opening (10), and which at the other end is preloaded against the buttress surfaces (13, and 14), is housed in each through opening (10).

This second embodiment is the kinematic reverse of the approach defined in the first mentioned embodiment.

An advantageous embodiment of the servo valve according to the present invention includes that the through openings (10) run parallel to one another, and the buttress surface (13) of the flange (1) runs transversely to the longitudinal axes (12) of the through openings (10). The servo valve thus can be produced in particularly simple fashion.

In a preferred embodiment, the through openings (10) are equipped with internal threads, and the closure plugs (3) are configured as set screws. Thus, it is particularly easy to set or adjust the preload force at a later time.

Other advantageous embodiments include that the servo valve further includes that:

(a) a stud-like pressure element (6), which is slidingly axially displaceable in the respective through opening (10), is arranged in each case between the buttress surfaces (13 and 14) and the ends of the helical compression springs (2) preloaded thereagainst;

(b) a ball (8) which is slidingly axially displaceable in the respective through opening (10) is arranged in each case between the buttress surfaces (13 and 14) and the end of the helical compression springs (2) preloaded thereagainst; and/or (c) each helical compression spring (2) is enclosed on the side facing the buttress surfaces (13 and 14) by a cup-shaped sleeve (7), a cylindrical wall region (15) of the sleeve (7) extending coaxially with the helical compression spring (2) and being slidingly axially displaceable in the respective through opening (10), while a base (16) of the sleeve (7) is arranged between the buttress surfaces (13 and 14) and the end of the respective helical compression spring (2) preloaded thereagainst.

The embodiments improve energy transfer from the helical compression springs to the buttress surfaces.

BRIEF DESCRIPTION OF THE DRAWINGS

Reference is made regarding preferred features of the present invention to the claims and to the explanation which follows of the drawings, on the basis of which preferred embodiments of the invention are presented. In the drawings, schematically in each case:

DETAILED DESCRIPTION

Figure 1:
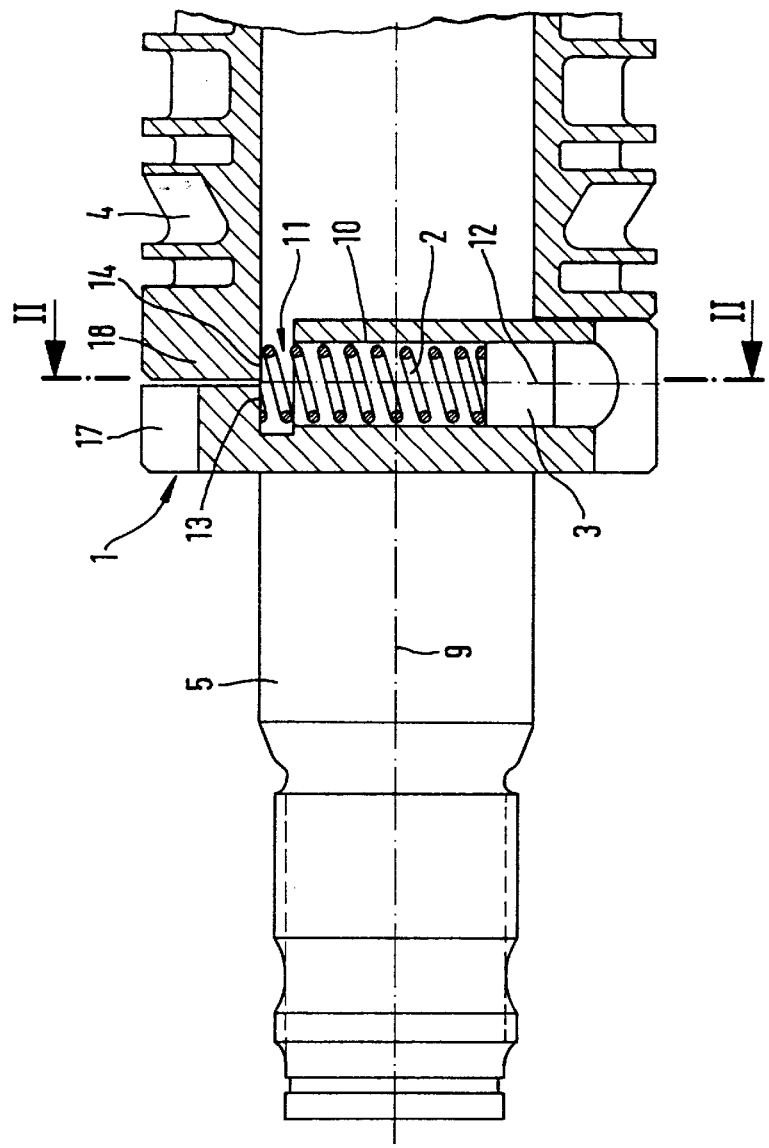
FIG. 1 shows a partially sectioned side view of a servo valve according to the present invention in the region of resilient energy transfer between a rotary slider and a control bushing.

Corresponding to FIG. 1, a shaft-like rotary slider 5 is oriented coaxially with a control bushing 4 and mounted thereon in rotationally displaceable fashion about a rotation axis 9. On the outer side of rotary slider 5, a flange 1 extending substantially radially is joined nonrotatably to rotary slider 5. Flange 1 is positioned axially with respect to rotation axis 9 in such a way that axial clearance is constituted between flange 1 and control bushing 4, allowing a rotational displacement of control bushing 4 with respect to flange 1 and thus with respect to rotary slider 5.

Two through openings 10, running perpendicular to rotation axis 9 and eccentrically with respect thereto—of which, however, only one is visible in the view corresponding to FIG. 1—are arranged in flange 1. Through opening 10 is axially delimited with respect to a longitudinal axis 12 of through opening 10, at its axially lower end corresponding to FIG. 1, by a closure plug 3 which is axially immobilized in through opening 10. This immobilization is accomplished, for example, by caulking, welding, or jamming; closure plug 3 can also be configured as a set screw which can then be screwed into through opening 10 configured as a threaded hole.

Arranged in through opening 10 is a helical compression spring 2 which is braced at its lower end corresponding to FIG. 1 against closure plug 3, and in the region of its other end extends out of one open end 11 of through opening 10 and rests under preload against a region 17 of flange 1 and a region 18 of control bushing 4. The latter regions 17 and 18 are preferably configured congruently at least in the direction of rotation axis 9, and each extend approximately up to longitudinal axis 12 or up to the center plane of through opening 10; with their undersides facing through opening 10, each covers open end 11 of through opening 10 approximately halfway.

Region 17 of flange 1 covering open end 11 of through opening 10 is configured, on its underside facing compression spring 2, as a buttress surface 13 which runs substantially perpendicular to longitudinal axis 12 of through opening 10. Region 18, which constitutes an axial extension of control bushing 14 with respect to rotation axis 9, is correspondingly configured on its underside, which covers through opening 10, in the form of a second buttress surface 14, which in the neutral position shown in FIG. 1 runs parallel to first buttress surface 13. Helical compression spring 2 can thus rest simultaneously against both buttress surfaces 13 and 14 under preload.

When a relative rotation occurs between control bushing 4 and rotary slider 5 or flange 1, one of helical compression springs 2 is in each case compressed, thus establishing the steering feel described above. In addition, the particular helical compression spring 2 that is compressed causes a return force, into the neutral position depicted in the Figures, between the rotating parts (control bushing 4 and rotary slider 5).

Figure 2:
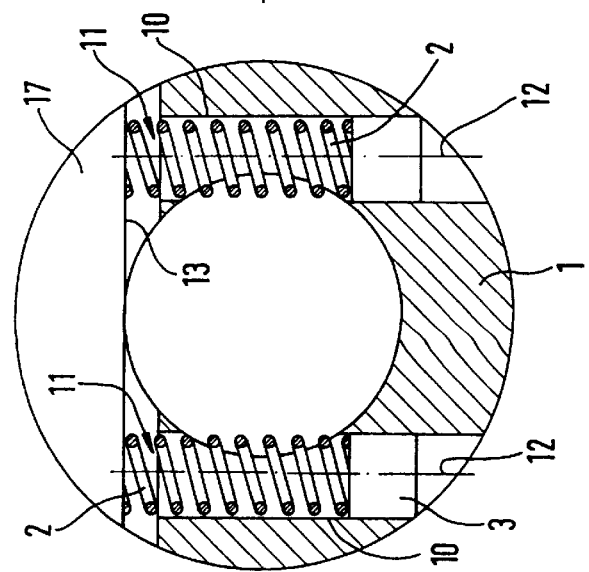
FIG. 2 shows a plan view of a cross section of the servo valve corresponding to arrows II in FIG. 1.

In a sectioned plan view corresponding to arrows II in FIG. 1, both helical compression springs 2 are now evident, as shown in FIG. 2. In the preferred embodiment that is depicted, these are oriented parallel to one another, so that buttress surfaces 13 and 14 are also advantageously configured in linear fashion over their entire length.

During assembly of the servo valve according to the present invention, the preload of helical compression springs 2 against buttress surfaces 13 and 14, and their return force into the neutral position, are established via the axial positioning of closure plugs 3. Any tolerance-related dimensional deviations that may be present, for example in terms of the length of helical compression springs 2, are thereby automatically compensated for. In addition, different preload values and thus different steering characteristics can be set as a function of the vehicle model for which the power steering system and the servo valve are to be used.

Figure 3:
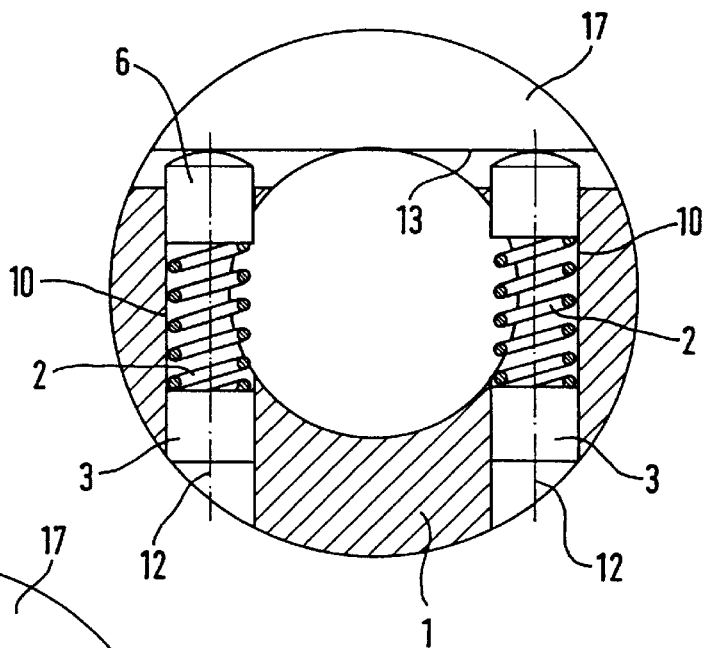
FIG. 3 shows a cross section as in FIG. 2, but with a pressure element arranged between the compression springs and buttress surfaces.

In order to improve energy transfer from helical compression springs 2, depending on the relative positions of rotary slider 5 and control bushing 4, to buttress surface 13 and/or to buttress surface 14, stud-like pressure elements 6 can be associated with helical compression springs 2, as shown in FIG. 3. A pressure element 6 of this kind is arranged in each case between helical compression spring 2 and buttress surfaces 13 and 14, and is slidingly axially displaceable in the respective through opening 10. In the exemplary embodiment corresponding to FIG. 3, the ends of pressure elements 6 associated with buttress surfaces 13 and 14 are configured in the form of rounded spherical surfaces, thus constituting, in each relative position between rotary slider 5 and control bushing 4, a consistent and approximately point-like energy transfer point.

Figure 4:
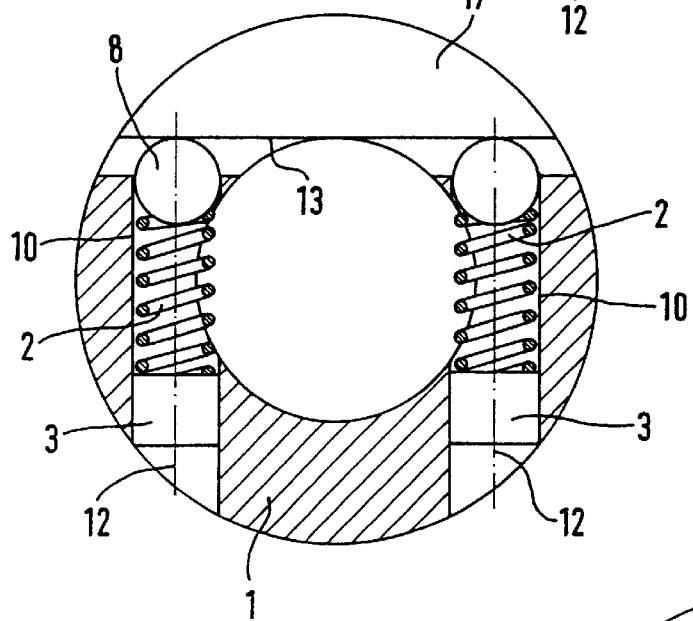
FIG. 4 shows a cross section as in FIG. 2, but with balls arranged between the compression springs and buttress surfaces.

In another advantageous embodiment corresponding to FIG. 4, pressure elements 6 are replaced by balls 8 which are also slidingly axially displaceable in through openings 10, and generate an approximately point-like energy transfer point.

Figure 5:
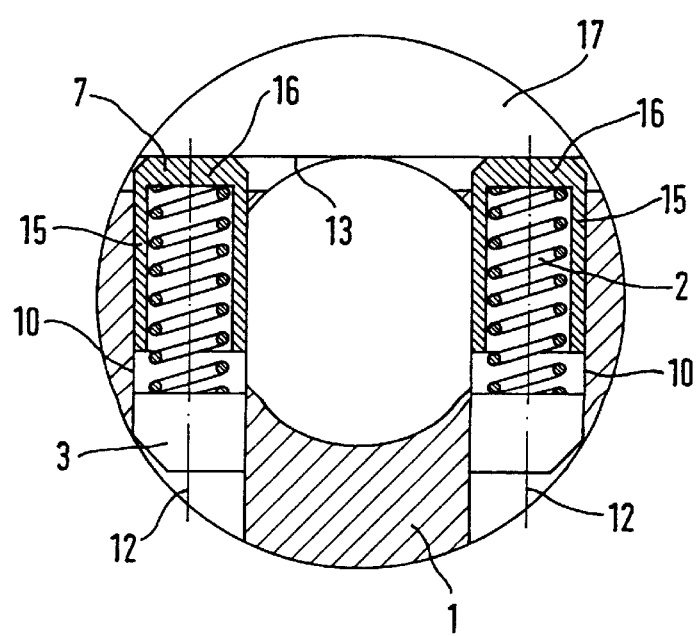
FIG. 5 shows a cross section as in FIG. 2, but with sleeves arranged between the compression springs and buttress surfaces.

In another embodiment corresponding to FIG. 5, a cup-shaped sleeve 7 is coaxially slipped onto each helical compression spring 2 in a region of helical compression springs 2 facing buttress surfaces 13 and 14. In this context, a base 16 of sleeve 7 is arranged between buttress surfaces 13 and 14 and the ends of helical compression springs 2 which face them. A cylindrical wall 15 of sleeve 7 receives the respective helical compression spring 2, and extends up to the vicinity of closure plug 3. Sleeve 7 is slidingly axially displaceable in through opening 10. Between closure plug 3 and the open end of sleeve 7, there must remain with respect to longitudinal axis 12 of through opening 10 an axial spacing which still guarantees a predefined maximum rotational displacement of control bushing 4 relative to rotary slider 5.

What is claimed is:

1. A servo valve of a rotary slide valve type comprising:
    a rotary slider;
    a control bushing coaxially enclosing the rotary slider and rotatable relative to the rotary slider about a rotation axis against a spring force;
    a flange nonrotatably attached to the rotary slider with rotary clearance with respect to the control bushing, the flange having two through-openings arranged eccentrically with respect to the rotation axis, the two through-openings lying in a plane running transversely to the rotation axis;
    each through-opening being covered by a region of the flange at an open end approximately up to a center plane of the through-opening in a direction of the rotation axis on a rotary slider side, the region of the flange forming a first buttress surface facing the open end and being axially spaced with respect to a longitudinal axis of the through-opening;
    the control bushing being prolonged on a flange side in the direction of the rotation axis by an extension forming a second buttress surface substantially congruent with the first buttress surface and covering the open end of each through-opening on a control bushing side approximately up to the center plane; and
    a helical compression spring housed in each through-opening, each helical compression spring braced at a spring end against a closure plug arranged in a region of an end of the through-opening facing away from the first and second buttress surfaces, the closure plug being immobilized with respect to the longitudinal axis, each helical compression spring at an other spring end being preloaded against the first and second buttress surfaces.

2. The servo valve as recited in claim 1 wherein the servo valve is part of a hydraulic power steering system for a motor vehicle.

3. The servo valve as recited in claim 1 wherein the two through-openings run parallel to one another, and the first buttress surface runs transversely to the longitudinal axes of the two through-openings.

4. The servo valve as recited in claim 1 wherein the two through-openings are equipped with internal threads, and the closure plugs are configured as set screws.

5. The servo valve as recited in claim 1 further comprising a stud-like pressure element slidingly axially displaceable in a respective of the two through openings and arranged in the through-opening between the first and second buttress surfaces and the other spring end of the helical compression spring preloaded against the first and second buttress surfaces.

6. The servo valve as recited in claim 1 further comprising a ball slidingly axially displaceable in a respective of the two through openings and arranged in the through opening between the first and second buttress surfaces and the other spring end of the helical compression spring preloaded against the first and second buttress surfaces.

7. The servo valve as recited in claim 1 further comprising a cup-shaped sleeve having a cylindrical wall region and a base, the cup shaped sleeve enclosing each helical compression spring on a side facing the first and second buttress surfaces, the cylindrical wall region of the sleeve extending coaxially with the helical compression spring and being slidingly axially displaceable in a respective of the through openings, while the base is arranged between the first and second buttress surfaces and the other end of the respective helical compression spring preloaded against the first and second buttress surfaces.

8. A servo valve of a rotary slide valve type comprising:
   a rotary slider;
   a control bushing coaxially enclosing the rotary slider and rotatable relative to the rotary slider about a rotation axis against a spring force;
   a flange nonrotatably attached to the control bushing with rotary clearance with respect to the rotary slider, the flange having two through-openings arranged eccentrically with respect to the rotation axis, the two through-openings lying in a plane running transversely to the rotation axis;
   each through-opening being covered by a region of the flange at an open end approximately up to a center plane of the through-opening in a direction of the rotation axis on a control bushing side, the region of the flange forming a first buttress surface facing the open end and being axially spaced with respect to a longitudinal axis of the through-opening;
   the rotary slider being prolonged on a flange side in the direction of the rotation axis by an extension forming a second buttress surface substantially congruent with the first buttress surface and covering the open end of each through-opening on a rotary slider side approximately up to the center plane; and a helical compression spring housed in each through-opening, each helical compression spring braced at a spring end against a closure plug arranged in a region of an end of the through-opening facing away from the first and second buttress surfaces, the closure plug being immobilized with respect to the longitudinal axis, each helical compression spring at an other spring end being preloaded against the first and second buttress surfaces.

9. The servo valve as recited in claim 8 wherein the servo valve is part of a hydraulic power steering system for a motor vehicle.

10. The servo valve as recited in claim 8 wherein the two through-openings run parallel to one another, and the first buttress surface runs transversely to the longitudinal axes of the two through-openings.

11. The servo valve as recited in claim 8 wherein the two through-openings are equipped with internal threads, and the closure plugs are configured as set screws.

12. The servo valve as recited in claim 8 further comprising a stud-like pressure element slidingly axially displaceable in a respective of the two through openings and arranged in the through-opening between the first and second buttress surfaces and the other spring end of the helical compression spring preloaded against the first and second buttress surfaces.

13. The servo valve as recited in claim 8 further comprising a ball slidingly axially displaceable in a respective of the two through openings and arranged in the through opening between the first and second buttress surfaces and the other spring end of the helical compression spring preloaded against the first and second buttress surfaces.

14. The servo valve as recited in claim 8 further comprising a cup-shaped sleeve having a cylindrical wall region and a base, the cup shaped sleeve enclosing each helical compression spring on a side facing the first and second buttress surfaces, the cylindrical wall region of the sleeve extending coaxially with the helical compression spring and being slidingly axially displaceable in a respective of the through openings, while the base is arranged between the first and second buttress surfaces and the other end of the respective helical compression spring preloaded against the first and second buttress surfaces.

* * * * *

UNITED STATES PATENT AND TRADEMARK OFFICE
CERTIFICATE OF CORRECTION

PATENT No.: 6,027,096

DATED : February 22, 2000

INVENTOR(S): Karl-Hans KÖHLER and Gerd SPEIDEL

It is certified that error appears in the above-identified patent and that said Letters Patent is hereby corrected as shown below:

Column 2, line 8, after "vehicles," insert -- in the form of a rotary slide --; and Column 5, line 56, change "A pressure clement 6" to -- A pressure element 6 --.

Signed and Sealed this

Third Day of April, 2001

*Attest:*

NICHOLAS P. GODICI

*Attesting Officer*   Acting Director of the United States Patent and Trademark Office